No. 684,712. Patented Oct. 15, 1901.
C. H. PASCHKE.
BICYCLE WHEEL TIRE.
(Application filed Feb. 27, 1901.)
(No Model.) 3 Sheets—Sheet 1.
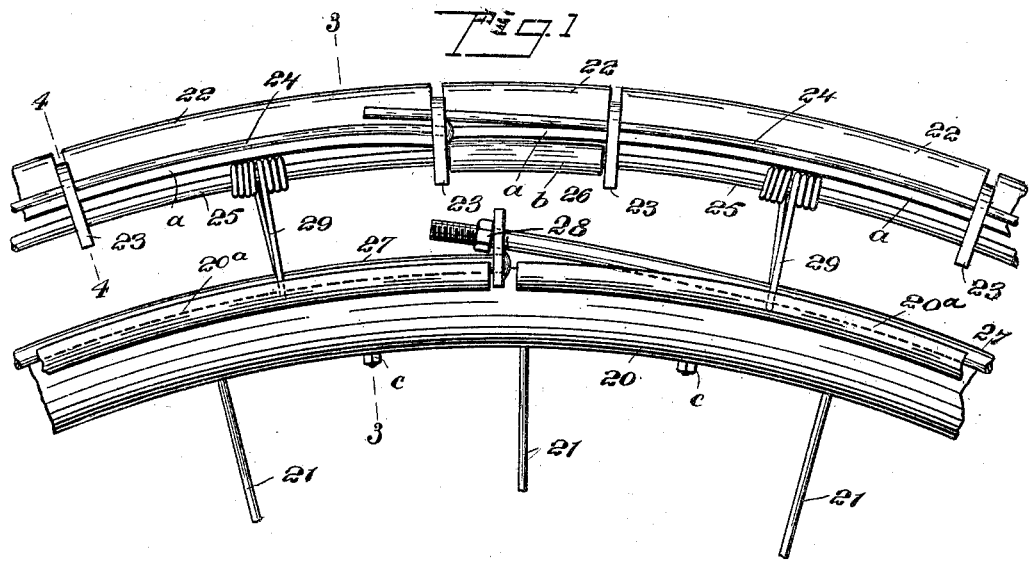
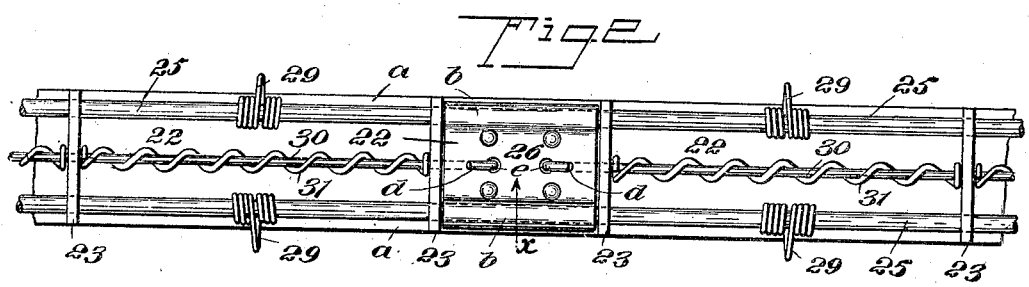
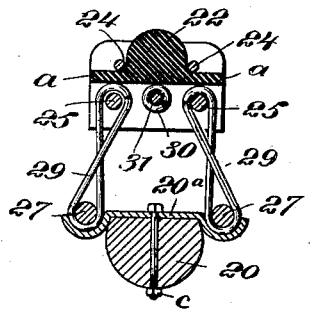
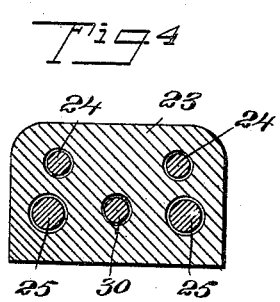
WITNESSES:
J. A. Boophy
Wm. L. Patton
INVENTOR
Charles H. Paschke
BY
[signature]
ATTORNEYS No. 684,712. Patented Oct. 15, 1901.
C. H. PASCHKE.
BICYCLE WHEEL TIRE.
(Application filed Feb. 27, 1901.)
(No Model.) 3 Sheets—Sheet 2.
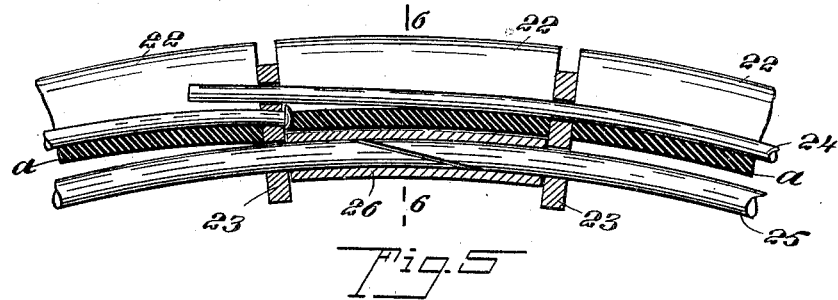
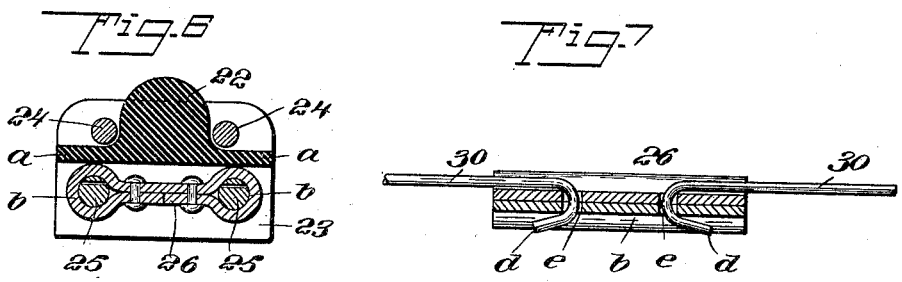
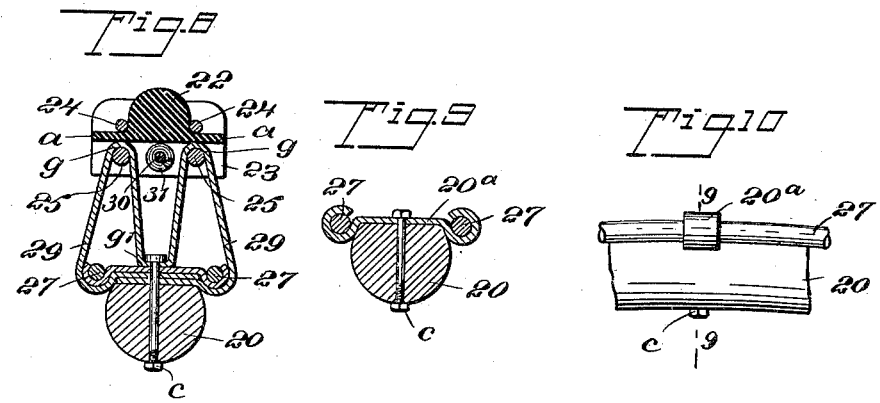
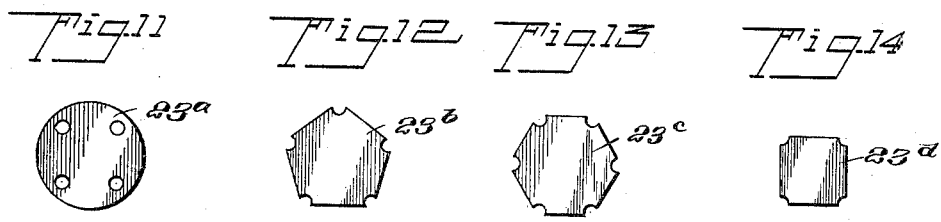
WITNESSES:
J. A. Brophy
Wm. P. Patton
INVENTOR
Charles H. Paschke
BY [signature]
ATTORNEYS No. 684,712. Patented Oct. 15, 1901.
C. H. PASCHKE.
BICYCLE WHEEL TIRE.
(Application filed Feb. 27, 1901.)
(No Model.) 3 Sheets—Sheet 3.
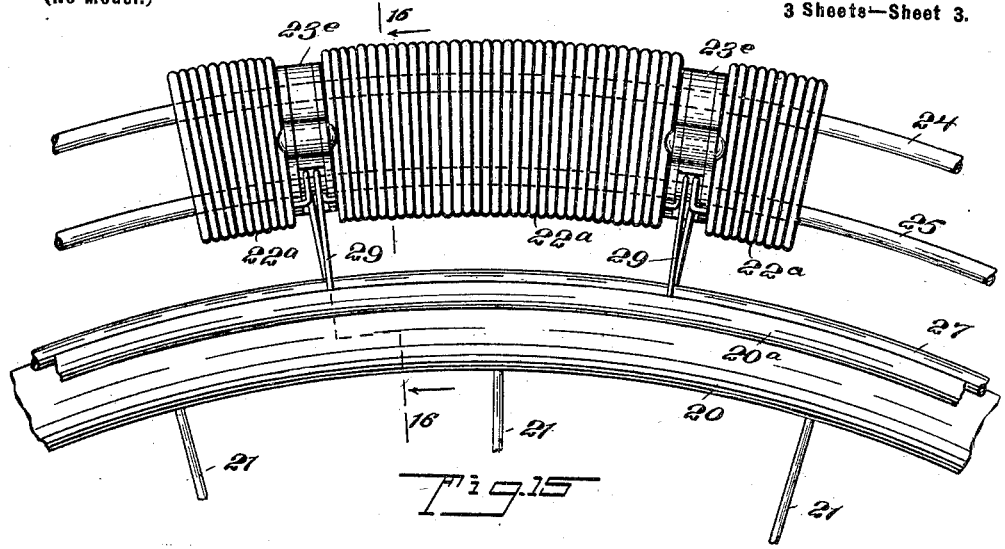
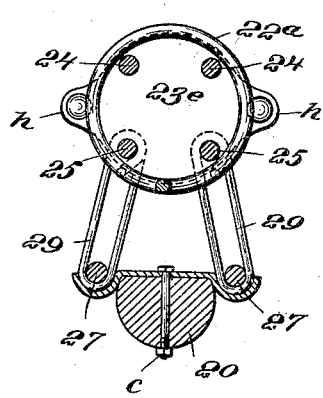
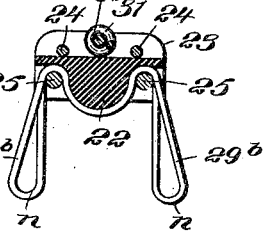
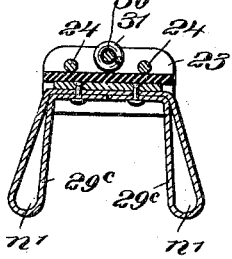
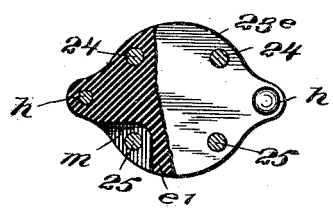
WITNESSES:
INVENTOR
Charles H. Paschke
BY
ATTORNEYS

UNITED STATES PATENT OFFICE.

CHARLES HERMAN PASCHKE, OF BUFFALO, NEW YORK.

BICYCLE-WHEEL TIRE.

SPECIFICATION forming part of Letters Patent No. 684,712, dated October 15, 1901.

Application filed February 27, 1901. Serial No. 49,027. (No model.)

*To all whom it may concern:*

Be it known that I, CHARLES HERMAN PASCHKE, a citizen of the United States, and a resident of Buffalo, in the county of Erie and State of New York, have invented a new and Improved Bicycle-Wheel Tire, of which the following is a full, clear, and exact description.

This invention relates to the tires of bicycle-wheels or wheels of other vehicles which it is essential shall be measurably elastic.

The object of my invention is to provide a resilient wheel-tire of novel construction which is practical and durable and that may be produced at moderate cost.

The invention consists in the novel construction and combination of parts, as is hereinafter described, and defined in the appended claims.

Reference is to be had to the accompanying drawings, forming a part of this specification, in which similar characters of reference indicate corresponding parts in all the figures.

Figure 1 is a side view in part of a bicycle-wheel having the improvements. Fig. 2 is an inverted plan view of the same. Fig. 3 is a transverse section substantially on the line 3 3 in Fig. 1. Fig. 4 is a like view on the line 4 4 in Fig. 1. Fig. 5 is a partly-sectional side view of a portion of the improved tire, showing a novel supporting and clamping device for the tire-sections. Fig. 6 is a transverse sectional view substantially on the line 6 6 in Fig. 5. Fig. 7 is a longitudinal sectional view of a novel coupling for a spring-wire ring employed, taken opposite the arrow *x* in Fig. 2. Fig. 8 is a transverse sectional view showing a slightly-changed construction of details represented in Fig. 3. Fig. 9 is a transverse sectional view substantially on the line 9 9 in Fig. 10. Fig. 10 is a side view in part of the bicycle-wheel rim, a portion of a tension wire ring employed, and an end view of a transverse clamp that engages duplicate tension wire rings held oppositely upon the wheel-rim. Figs. 11, 12, 13, and 14 are side views of modified forms of spacing-blocks employed. Fig. 15 is a side view of a portion of a vehicle-wheel, showing a modified construction of the resilient tire and a modified form of the tire-supports which hold the tire-sections concentric with the wheel-rim. Fig. 16 is a transverse sectional view substantially on the line 16 16 in Fig. 15. Fig. 17 is a transverse sectional view of details of construction arranged to hold the gum tire-sections shown in Fig. 6 reversed, so as to dispose wire spacing-coils therefor exteriorly of the gum tire-sections and adapt said coils to serve as the tread of the tire. Fig. 18 is a transverse sectional view of details substantially the equivalents of those shown in Fig. 17, but having the resilient supports of the tire formed of strips of elastic metal instead of wire; and Fig. 19 is a detached and partly-sectional face view of one of the spacing-blocks preferably employed for the resilient tire shown in Figs. 15 and 16.

In the drawings which represent the construction and application of the invention upon a vehicle-wheel, and particularly upon one of the traction-wheels for a bicycle or the like, 20 indicates a portion of the rim of such a wheel, and 21 the spokes of the wheel, that in complete form hold the rim concentric with the hub thereof, as usual. The tire proper may with advantage be formed of a plurality of tread-sections of elastic material, either vulcanized gum or resilient-wire coils.

In the several figures where the gum tread-sections 22 appear it will be seen that each of said tread portions has a peculiar shape, comprising a solid rib having a convex tread-face, and at each side of said rib a similar integral flange *a* is laterally extended. Between the true ends of each adjacent pair of tread-sections 22 a spacing-block 23, preferably of metal, is introduced, these blocks of suitable thickness each having parallel side faces and a peripheral formation that may be somewhat varied—as, for example, the spacing-blocks may with advantage have a laterally-elongated and substantially rectangular form when used in connection with the gum tire-sections 22, the upper corners of the blocks being reduced and rounded, as shown in Figs. 3, 4, 6, and 8. The series of gum tread-sections 22 are held circularly arranged together, with a suitable number of spacing-blocks 23 intervening their ends by two pairs of wire rings 24 24 and 25 25, the latter pair being termed "carrier-rings" and the other pair "binding-rings," to be hereinafter described. The rings 25 pass through two spaced perforations formed in each block 23, near the lower edge thereof, and upon said wire rings the flanges $a$ of the gum tread-sections are seated. The ends of each carrier-ring 25 are cut to taper them, and these portions have a lapped engagement with each other, as clearly shown in Fig. 5. The preferred means for holding the lapped ends of the carrier wire rings 25 suitably clamped, so as to permit the ends of each ring to have a limited slidable movement endwise on each other, is clearly shown in Figs. 5 and 6 and consists of a spacing-clamp 26, formed of a single piece of plate metal having its ends lapped, so as to have bearing on the central portion, and provided with two spaced tubulations $b$ for the reception of the lapped ends of the wire carrier-rings 25.

The ends of the plate material forming the spacing-clamp 26 are secured upon the intermediate portion by rivets or the like, as indicated in Fig. 6, the width of the plate material forming the clamp being sufficient to receive in the tubulations $a$ cylindrical body portion of each end of a carrier-ring, thereby producing a reliable guide-box for the engaged ends of each carrier-ring.

As represented in Fig. 5, two spacing-blocks 23 are disposed, respectively, at the side edges of the tubulated clamp 26, a short section of the gum tread 22 fitting between these two blocks and having its flanges $a$ seated upon the tubulations $b$, as best shown in Fig. 6, this construction affording a continuous ring when the parts are assembled.

The diameter of the sectional tread-ring for the wheel-tire is so proportioned to that of the rim 20 as to afford an annular space between said parts, and upon the outer face of the rim 20 a shoe $20^a$ is imposed, which may be in ring form or, if preferred, may be formed of several spaced segments, as represented in Fig. 10. The shoe or shoes $20^a$ each consists of plate metal having concavities or tubulations along the side edges thereof and a flat intervening portion which seats upon the outer face of the tire-rim 20, to which the shoe or shoes are secured by bolts $c$, as shown in Figs. 3, 8, 9, 10, and 16. In the tubulations of the shoe-sections $20^a$ two similar wire tension-rings 27 are held loosely, and each one is drawn taut by means of a clamping device 28, as indicated in Fig. 1.

At suitable intervals a plurality of similar resilient bracket-arms 29 are introduced between the carrier-rings 25 and the tension-rings 27, so as to connect them in an elastic manner and hold the tread portion of the tire concentrically upon the wheel-rim 20. The bracket-arms 29 may be formed either of pliable bands of gum fabric or cloth or of laterally-elastic metal strips, as indicated in Figs. 8, 16, and 18, or spring-wire rods, as shown in Figs. 1, 2, 3, 15, and 17. When elastic wire is employed as a material for the bracket-arms 29, said arms each consists of a strand of wire bent into loop form near the center of length, so as to engage the loop with the body of one of the tension wire rings 27, and seat said loop in the concavity or tubulation of an adjacent end of a shoe-section $20^a$, as indicated in Figs. 3 and 16. Usually the bracket-arms 29 have their end portions extended upward from the loop thereon, and said ends are then wrapped around an appropriate tension wire ring 27, as shown in Figs. 1 and 2. It is preferred to locate the bracket-arms 29 oppositely in pairs, so that they will support the tread portion of the tire at like points on the wheel-rim, as shown in Fig. 2.

The spacing-blocks 23 each has two perforations formed therein above the perforations which receive the carrier-rings 25, and through these upper perforations the two similar binding-rings 24 are inserted, having bearing contact with the upper surfaces of the flanges $a$ on each gum tread-section 22. The binding-rings 24 have one end of each secured by any suitable means within a perforation in one of the spacing-blocks 23, and directly above this secured end of the binding-ring a perforation is formed in the spacing-block for the loose insertion therethrough of the other end of said binding-ring, as clearly shown in Figs. 1 and 5.

To provide means for retaining the block 23 in position, so as to prevent improper endwise movement of the gum tread-sections 22 on the carrier-rings 25, a wire core-ring 30 may be inserted loosely through perforations in the spacing-blocks 23, formed between the perforations that receive the carrier-rings, and between each pair of spacing-blocks 23 a wire coil 31 is mounted upon the core-ring 30, having the ends thereof pressed against the pair of blocks, as shown in Fig. 2.

The block 26, that has already been described as serving to clamp the ends of the carrier-rings 25 in slidable engagement, is also provided with two spaced holes $e$, wherein hooks $d$, formed on the ends of the core-ring 30, are hooked and the ring thus drawn taut, and as the block 26 has its ends impinged against two adjacent spacing-blocks 23 it will be evident that the coil-sections 31 will prevent an improper movement of the spacing-blocks and tread-section between which they are located. Should it be preferred to utilize strips of elastic metal in the formation of the spring bracket-arms 29, such strips may each be bent to provide two spaced loops $g$ thereon for engagement with the rings 25 and at the center of said strip have another loop $g'$ formed, as shown in Fig. 8. In this modified construction of the spring bracket-arms the loop $g'$ is perforated to receive a bolt $c$ and, as shown, provides two laterally-resilient arm members at each side of each carrier-wire 25, having sufficient length to properly space said rings from the tension-rings 27, whereon the bent end portions of the metal strip composing the bracket-arm have hooked engagement and also a lapped engagement with each other and with the upper side of the tire-rim 20, upon which the bracket-arm is held by the bolt c, that passes down through perforations in the rim, which aline with the perforation in the loop g'. As before mentioned, the series of spacing-blocks which intervene the tread-sections of the improved tire may be considerably changed in construction within the scope of the invention—as, for instance, each block may be circular, as shown at $23^a$ in Fig. 11, pentagonal, as shown at $23^b$ in Fig. 12, octagonal, as shown in Fig. 13 at $23^c$, or rectangular, as shown in Fig. 14 at $23^d$, suitable perforations or indentations being formed in or on such spacing-plates to receive the wire rings employed for supporting tread-sections of the tire.

In Figs. 15 and 16 is shown an advantageous construction of the improvement, wherein wire coils $22^a$ are substituted in place of the gum tread-sections 22, and in said figures and Fig. 19 is shown another modification $23^e$ of the spacing-blocks that may be employed with the coiled-wire tread-sections $22^a$.

It will be seen that the spacing-blocks $23^e$ each consists of two nearly-circular plates having ears h laterally formed thereon to receive rivets or screws which hold said plates clamped upon an intervening cushion-piece e'. The spacing-blocks $23^e$ are mounted upon the four wire rings 24 24 and 25 25 in sufficient number to hold the coiled-wire tread-sections $22^a$ spaced apart and in compressed condition. In this construction of the improvement it is preferred to use resilient-wire bracket-arms for connection of the carrier-rings 25 with the tension-rings 27, said arms having a looped engagement with the tension-rings, and then extending two spring members of each arm to have a hooked and secured engagement upon an appropriate carrier-ring, these hooked ends of the arms entering recesses formed at proper points between the two spaced plates of each composite spacing-block $23^a$, said recesses being each produced by cutting a notch m in the elastic cushion-piece e', as shown in Fig. 19.

In Figs. 17 and 18 a different arrangement of parts is shown which adapts the spacing wire coils 31 to become the tread for the tire, to effect which it is only necessary to reverse the position of each gum tread-section 22, so that the body portion will project down between the carrier-rings 25, the binding-rings 24 then bearing upon the previously lower faces of the flanges a. It may also be found of advantage when the gum tread-sections 23 are reversed to change the formation of the spring bracket-arms somewhat, as shown in Fig. 17. In this modification a pair of bracket-arms $29^b$ is formed from one of the wire rods and is bent at the center of length to provide a cradle wherein the reversed tread of the gum section 22 is supported, the remaining portions of said strand of wire having two depending spaced loops n formed thereon, which in service are engaged with the tension-rings 27, the remaining end portions of said wire strand being hooked upon or otherwise secured to the carrier-rings 25, as indicated in Fig. 17.

In Fig. 18 at $29^c$ another modification for the resilient bracket-arms is shown, wherein an elastic metal strip is utilized in the formation of each arm, said strip being bent to produce two depending spaced loops n' and two spring members at each side of each of said loops, the ends of the strips which are bent so as to project toward each other below a flat intermediate portion thereof being secured upon the part on which they bear.

It will be seen from the foregoing description that the essential features of the improvement comprise a plurality of elastic tread-sections for a wheel-tire, means for holding the tread-sections in ring form, and resilient arms which serve to elastically retain the composite tread-ring concentric with two spring tension-rings clamped upon each side of a wheel-rim.

Having thus described my invention, I claim as new and desire to secure by Letters Patent—

1. A bicycle-wheel tire, comprising gum tread-sections, spacing-blocks therefor, carrier-rings and binding-rings adapted to retain the blocks and tread-sections in ring form, and means for holding the series of tread-sections and spacing-blocks concentrically spaced from the rim of the wheel.

2. A bicycle-tire, comprising a plurality of elastic tread-sections, each having two opposite side flanges, means engaging the ends of the tread-sections and also engaging with the top and bottom sides of said lateral flanges, adapted to assemble the tread-sections in ring form, and a plurality of like devices which support the tread-ring concentrically with and spaced from the wheel-rim.

3. A bicycle-wheel tire, comprising elastic tread-sections, a plurality of elastic rings engaging the tread-sections, for their assemblage and support in ring form, a series of spring bracket-arms having engagement at one end with sundry of the elastic rings, and tension-rings held upon the wheel-rim and engaged by the other ends of the bracket-arms.

4. A bicycle-wheel tire, comprising a plurality of elastic tread-sections, a plurality of spacing-blocks intervening the tread-sections, carrier-rings and binding-rings passing through the spacing-blocks, and supporting the tread-sections in ring form, a core-ring also passing through the spacing-blocks, spring-coils mounted upon the core-ring and pressing upon the spacing-blocks, and means for elastically supporting the tread-ring concentrically upon the wheel-rim.

5. A bicycle-wheel tire, comprising a plurality of elastic tread-sections, a series of spacing-blocks, each composed of plates and an intervening elastic filling held secured together, said spacing-blocks having perforations therein, a plurality of elastic-wire rings passing through the perforations in the composite spacing-blocks, tension-rings held at the sides of the wheel-rim, and a plurality of spring bracket-arms engaging the tension-wires and sundry of the elastic rings, and holding the tread-sections in ring form concentrically spaced from the tension-rings and the wheel-rim.

6. In a bicycle-wheel tire of the character described, the combination with a plurality of tread-sections each composed of gum, having a solid body portion convexed on the tread-surface and provided with opposite side flanges, a plurality of spacing-blocks intervening the ends of the tread-section, carrier-rings having loosely-lapped tapered end portions, a clamping device loosely engaging said lapped ends and held between adjacent spacing-blocks, binding-rings bearing upon the side flanges of the tread-sections, tension-rings held at opposite sides of the wheel-rim, and spring bracket-arms adapted to hold the carrier-rings spaced concentrically from the tension-rings.

7. In a bicycle-wheel tire of the character described, the combination with a plurality of elastic tread-sections, a series of spacing-blocks intervening the tread-sections, and a plurality of elastic rings passing through the spacing-blocks and adapted to assemble the tread-sections in ring form, of elastic bracket-arms, two tension-rings, the bracket-arms extending between the tension-rings and sundry of the rings which engage the spacing-blocks, a wheel-rim, and shoes secured thereon and adapted to support the bracket-arms in place on the wheel-rim.

In testimony whereof I have signed my name to this specification in the presence of two subscribing witnesses.

CHARLES HERMAN PASCHKE.

Witnesses:
  ULYSSES S. THOMAS,
  RICHARD H. TEMPLETON.